D. C. KLAUSMEYER.
MACHINE TOOL GEARING.
APPLICATION FILED SEPT. 8, 1914.

1,204,668.

Patented Nov. 14, 1916.

WITNESSES,

David C. Klausmeyer, INVENTOR.
By Robert S. Carr.
Attorney,

UNITED STATES PATENT OFFICE.

DAVID C. KLAUSMEYER, OF OAKLEY, OHIO, ASSIGNOR TO THE CINCINNATI-BICKFORD TOOL COMPANY, OF OAKLEY, OHIO, A CORPORATION OF OHIO.

MACHINE-TOOL GEARING.

1,204,668.   Specification of Letters Patent.   Patented Nov. 14, 1916.

Application filed September 8, 1914.   Serial No. 860,547.

*To all whom it may concern:*

Be it known that I, DAVID C. KLAUSMEYER, a citizen of the United States, residing at Oakley, Ohio, have invented a new and useful Improvement in Machine-Tool Gearing, of which the following is a specification.

Figure 2:
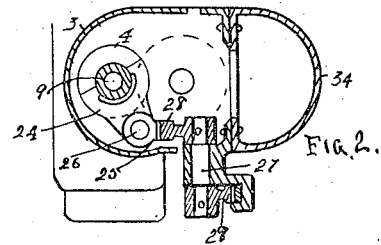
Figure 4:
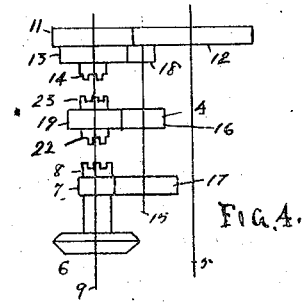
Figure 1:
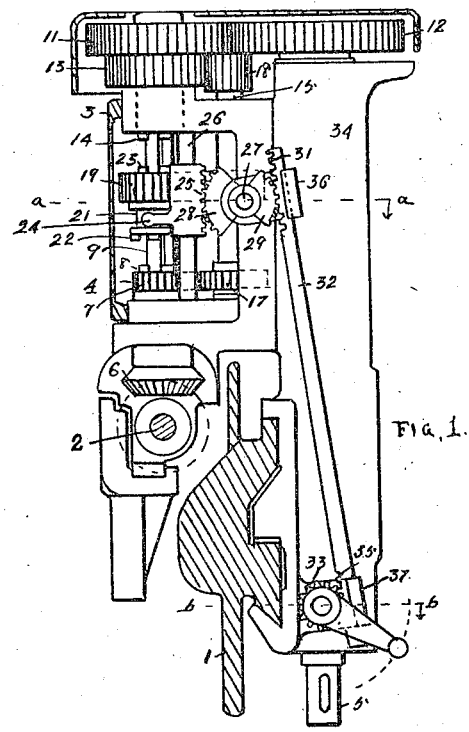
Figure 3:
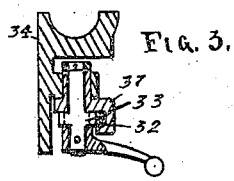

My invention relates to machine tool gearing, and the objects of my improvement are to provide accessible connections for shifting change speed gears which may be beyond the reach of the operator, and to provide simple and durable construction and assemblage of coacting members for securing facility of operation and efficiency of action. These objects may be attained in the following described manner, as illustrated in the accompanying drawings in which:

Figure 1 represents an elevation with parts in section of portions of a radial drill provided with my improvements; Figs. 2 and 3 cross sections on the respective lines *a—a* and *b—b* of Fig. 1, and Fig. 4 a diagram of the speed changing gears.

In the drawings, 1 represents the radial arm, 2 the driving shaft, 3 the gear box adjustably supported on the arm in the usual manner, 4 the change speed gears therein, and 5 the spindle to be driven at different speeds, all being constructed and arranged in the ordinary manner.

Gear 6 driven from shaft 2 and journaled in a fixed bearing, is formed with an axial opening in its hub and provided with a gear 7 formed with a clutch member 8 on its end. A shaft 9 journaled concentric with gear 7 and to turn in the axial opening in the hub of gear 6 is provided with a tight gear 11 in continuous engagement with the spindle gear 12 and also with a loose gear 13 formed with a clutch member 14 and journaled by means of its hub in a fixed bearing.

An intermediate shaft 15 is provided with an intermediate gear 16 and also with gears 17 and 18 in continuous engagement with the respective driven gear 7 and the loose gear 13. A gear 19 formed with an annular groove 21 in its hub and with clutch members 22 and 23 on its respective ends is splined on shaft 9 between gears 7 and 13 thereon. A shifting yoke 24, formed with a rack 25 and slidably mounted on the fixed rod 26, movably engages with the annular groove 21 in the hub of gear 19. A short shaft 27 journaled in the casing of gear box 3 is provided on one end with a segmental gear 28 in engagement with the rack of the shifting yoke and on the opposite end with a smaller segmental gear 29 in engagement with the rack teeth 31 formed on the extension bar 32. A crank pinion 33, journaled in the casing of the spindle box 34, engages with the rack teeth 35 formed on bar 32 for moving said bar longitudinally in the fixed guides 36 and 37. The movement of said bar is transmitted through the segmental gears 28 and 29 to the shifting yoke 24 for moving gear 19 into or out of engagement with gear 16 and also for alternately engaging the clutch members 22 and 23 thereon with the respective clutch members 8 and 14.

In operation, gears 16, 17, 18, and 13 are driven continuously from gear 7, and shaft 9 through fast gear 11 thereon serves to transmit different speeds to the gear 12 with the spindle 5, corresponding to the longitudinal adjustment of gear 19 on shaft 9 in the following manner: The engagement of clutch members 8 and 22 drives shaft 9 with gear 11 from gear 6 at its highest speed; the engagement of gear 19 with the driven gear 16 drives shaft 9 with the gear 11 thereon at a slower speed; and the engagement of the clutch members 25 and 14 causes shaft 9 with gear 11 thereon to be driven at their slowest speed from driven gear 18. Gear 19 may be moved out of engagement with gear 16 and with the respective clutch members thereon disengaged from the clutch members 8 and 14 for discontinuing the action of shaft 9 and gear 11 thereon.

Having fully described my improvements, what I claim as my invention and desire to secure by Letters Patent of the United States is:

1. A radial drill comprising a vertically disposed change speed gear set, a longitudinally movable change speed element therein, said gear set being inaccessible to the operator, and rack and pinion mechanism and associated elements for moving the change speed element.

2. The combination of a spindle, a vertical driven shaft, inaccessible change speed gear connections therefrom with the spindle, an inaccessible change speed element movable longitudinally on the shaft, a hand lever fulcrumed at an accessible point, and rack and pinion and associated elements adapted to be actuated thereby for moving the change speed element.

3. In a radial drill the combination with a radial arm, and a gear box supported thereon, of a vertically disposed change speed gear set within the gear box and at an inaccessible elevation, a vertically movable change speed element, and rack and pinion shifting connections therewith conveniently accessible to the operator.

4. In a radial drill the combination of a spindle, a vertical shaft, gear connections therefrom with the spindle, driven loose gears on the shaft and formed with clutch members, a driven gear, an inaccessible gear splined on the shaft and formed with clutch members, an accessible hand lever, and rack and pinion and associated elements adapted to be actuated by the lever for moving the splined gear on the shaft into or out of engagement with the driven gear and also with the clutch members thereon into or out of engagement with the corresponding clutch members on the respective loose gears.

D. C. KLAUSMEYER.

Witnesses:
 AUG. H. TUECHTER,
 S. C. SCHAUER.